United States Patent [19]

Tsunoda

[11] 4,352,088
[45] Sep. 28, 1982

[54] VOICE WARNING SYSTEM FOR AN AUTOMOTIVE VEHICLE

[75] Inventor: Masakazu Tsunoda, Fujisawa, Japan

[73] Assignee: Nissan Motor Company, Limited, Kanagawa, Japan

[21] Appl. No.: 169,034

[22] Filed: Jul. 15, 1980

[30] Foreign Application Priority Data

Jul. 16, 1979 [JP] Japan ................................. 54-90082

[51] Int. Cl.³ ............................................. G08B 19/00
[52] U.S. Cl. .................................... 340/52 F; 340/53; 179/1 VL
[58] Field of Search ..................... 340/52 R, 52 F, 53, 340/539; 179/1 VE, 1 VL

[56] References Cited

U.S. PATENT DOCUMENTS 3,298,010  1/1967  Dubosq et al. ................... 340/52 F
4,015,237  3/1977  Takatani et al. .................. 340/52 F Primary Examiner—Alvin H. Waring
Attorney, Agent, or Firm—Lowe, King, Price & Becker

[57] ABSTRACT

An audible warning system of the present invention comprises sensors for detecting abnormal vehicle conditions, means for outputting corresponding speech warning information in response to any one of the sensors, and a relay to cut off or reduce the sound volume from other audio equipment provided within the same vehicle. Since the audible warning system thus improved can cut off or reduce the volume of sound other than warning information, the driver can hear the warning information clearly without interference from other sound even while other audio equipment within the same vehicle is operating.

5 Claims, 4 Drawing Figures

VOICE WARNING SYSTEM FOR AN AUTOMOTIVE VEHICLE

BACKGROUND OF THE INVENTION

1. Field of the Invention

The present invention relates generally to a voice warning system for an automotive vehicle which warns or informs the driver of various vehicle conditions by means of speech instead of indicator lights or buzzers, and more specifically to a controller to cut off or reduce the sound volume from other audio equipment provided within the same vehicle so that the driver can listen to the voice warning information clearly without interference from the other audio equipment.

2. Description of the Prior Art

In order to warn or inform the driver of various abnormal vehicle conditions such as engine temperature, engine oil level, brake oil level, disconnection of a headlight, etc., heretofore, a number of warning lights or buzzers have been used. Recently, however, a voice warning system has also been used, for this purpose, which can provide the driver with warnings or information on various abnormal vehicle conditions in voice form. In this case, the voice for warning or information is previously recorded on an appropriate audio device such as a tape recorder in place of lights or buzzers, and is reproduced in response to a signal from the corresponding sensor. However, if the warning voice is sounded while the other audio equipment such as a car radio, cassette tape recorder, or car TV is operating, the voice from the other audio equipment will interfere with the warning voice, and therefore the driver will not able to hear the warning voice clearly.

Therefore, there has been a need for a voice warning system for an automotive vehicle by which the driver can listen to the voice warning information clearly without interference with the other voice.

BRIEF SUMMARY OF THE INVENTION

With these problems in mind, therefore, it is the primary object of the present invention to provide a voice warning system for an automotive vehicle which includes a controller by which sound volume from other audio equipment provided within the same vehicle can be cut off or reduced whenever an abnormal state is detected by the sensors.

To achieve the above-mentioned object, the voice warning system of the present invention comprises a controller which is activated by the output signal from any one of the sensors to cut off or reduce the sound volume from the other audio equipment provided within the same vehicle, with the result that the driver can hear the warning information clearly without interference from the other audio equipment.

BRIEF DESCRIPTION OF THE DRAWINGS

The features and advantages of the audible warning system according to the present invention will be more clearly appreciated from the following description taken in conjunction with the accompanying drawings in which like reference numerals designate corresponding elements, and in which.

DETAILED DESCRIPTION OF THE INVENTION

Figure 1:
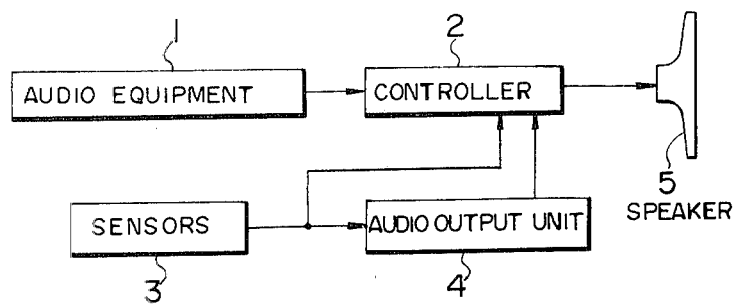
FIG. 1 is a block diagram of a first embodiment of the present invention.

Turning now to the drawings, and more specifically to FIG. 1, a preferred embodiment of the voice warning system of the present invention is illustrated in the form of a block diagram.

In FIG. 1, numeral 1 denotes audio equipment such as a car radio or car TV which is provided within a vehicle, 2 denotes a controller such as a relay, 3 denotes various sensors for detecting the engine temperature, engine oil level, etc., 4 denotes an audio output unit for the voice warning system, and 5 denotes a loadspeaker.

In this embodiment, if one of the sensors 3 detects an abnormal state in the automotive vehicle, the sensor 3 sends an abnormal signal to the audio output unit 4 so as to output voice warning information through the loudspeaker 5. In this case, since the abnormal signal is also sent to the controller 2, the controller 2 opens the circuit between the audio equipment 1 and the speaker 5.

Figure 2:
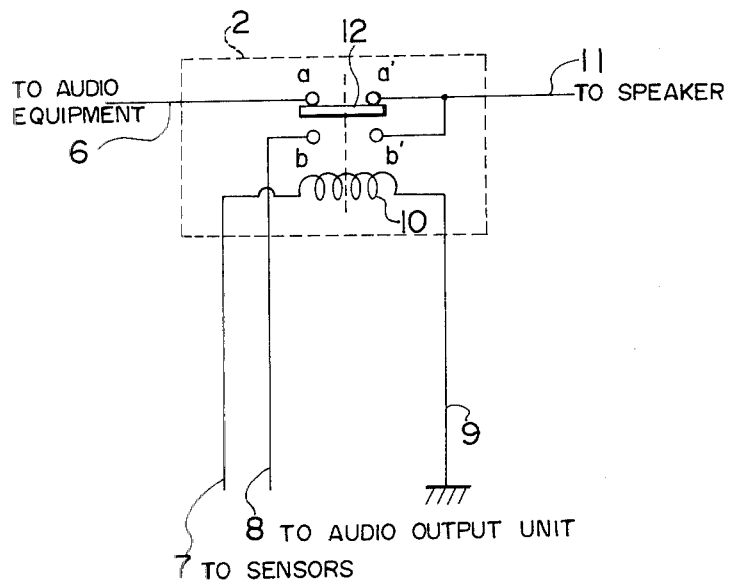
FIG. 2 is a schematic diagram of the controller of the first embodiment.

In more detail, FIG. 2 shows a relay circuit embodying the controller 2 of FIG. 1. In this figure, the relay is provided with a lead wire 6 connected to the audio equipment 1, a lead wire 7 connected to the sensors 3, a lead wire 8 connected to the audio output unit 4, a lead wire 9 to ground one end of a relay coil 10 when a sensor output is applied to the other end thereof, a lead wire 11 connected to the speaker 5, and a movable relay contact 12.

In this embodiment, under normal vehicle conditions, since the movable contact 12 is so set as to be brought into contact with two contacts a and a', the audio signal is directly output through the speaker 5.

In an abnormal vehicle condition, however, since one of the sensors detects an abnormal state and outputs an abnormal signal for energizing the relay coil 10 through the lead wires 7 and 9, the movable contact 12 is activated so as to be brought into contact with two other contacts b and b', and thereby the audio equipment 1 is separated from the speaker and the circuit of the audio output unit 4 for the warning system in closed to connect the unit 4 to the speaker 5 through the lead wires 8 and 11.

Therefore, the sound output from the audio equipment 1 is cut off and the sound output from the audio output unit 4 is heard through the speaker 5.

Figure 3:
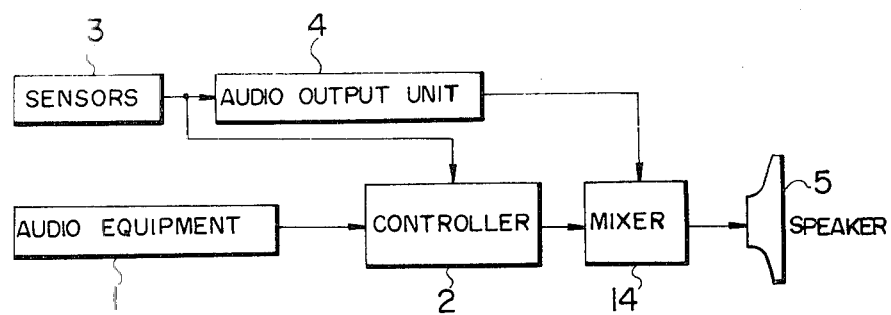
FIG. 3 is a block diagram of a second embodiment of the present invention.
Figure 4:
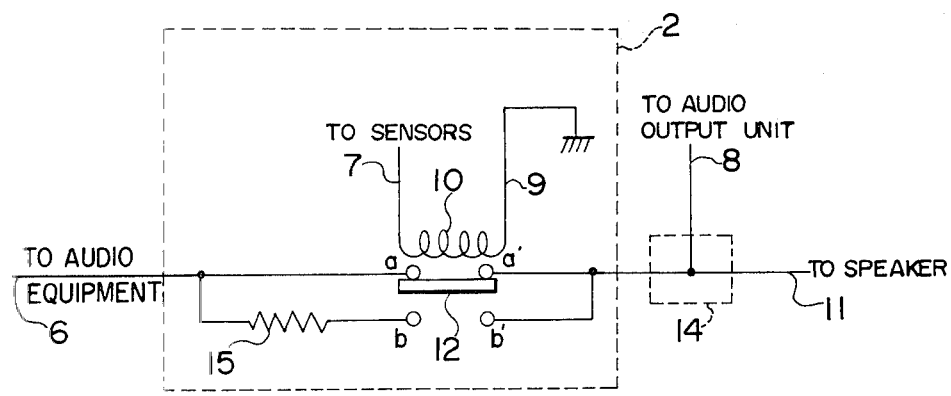
FIG. 4 is a schematic diagram of the controller of the second embodiment.

FIGS. 3 and 4 show a second embodiment of the present invention.

In FIG. 3, numeral 14 denotes a mixer in which the voice warning information signal is mixed with the other audio signal from the audio equipment 1.

In this embodiment, if one of the sensors 3 detects an abnormal state in the automotive vehicle, the sensor 3 applies an abnormal signal to the audio output unit 4 so as to output voice warning information through the mixer 14 and the speaker 5.

In this case, even if the audio equipment is outputting some audio signal, since the abnormal signal is also applied to the controller 2, the controller 2 switches a resistance into the audio output line so as to reduce the sound volume from the audio equipment 1. Therefore, it is possible for the driver to hear the voice warning information clearly through the mixer 14 and the speaker 5 while outputting audio signal from the audio equipment 1 moderately.

To explain in more detail, FIG. 4 shows a relay circuit embodying the controller 2 of FIG. 3. In this figure, the relay is provided with a lead wire 6 connected to the audio equipment 1, a lead wire 7 connected to the sensor 3, a lead wire 8 connected to the audio output unit 4, a lead wire 9 to ground a relay coil 10 to the ground when a sensor output is applied thereto, a lead wire 11 connected to the speaker 5, and a movable relay contact 12.

In this embodiment, under normal vehicle conditions, since the movable contact 12 is so set as to be brought into contact with two contacts a and a′, the audio signal is directly output through the mixer 14 and the speaker 5.

In an abnormal vehicle condition, however, since one of the sensors detects an abnormal state and outputs an abnormal signal for energizing the relay coil 10 through the lead wires 7 and 9, the movable contact 12 is switched so as to be brought into contact with two other contacts b and b′, and thereby a resistor 15 is switched into the circuit between the audio equipment 1 and the mixer 14, so as to reduce the sound volume from the audio equipment 1. The warning signal from the lead wire 8 and the audio signal from the audio equipment 1, the sound volume of which has already reduced through the resistor 15, are mixed in the mixer 14 and are output through the speaker 5. Therefore, it is possible for the driver to hear the voice warning information clearly without cutting off the sound from the audio equipment provided within the same vehicle.

In the embodiment described above, the controller 2 is disposed between the audio equipment and the speaker; that is to say, the speaker for the audio equipment is also used for the warning system. However, it is also possible for the warning system to use a separate speaker or speakers.

In addition, in the embodiment described above, although the controller 2 is disposed between the audio equipment and the speaker, it is also possible to dispose the controller before an audio amplifier stage of the audio equipment, that is to say, the audio amplifier and the speaker for the audio equipment can also be used for the warning system to minimize the number of components.

As described above, in the voice warning system of the present invention, since the controller can cut off or reduce the sound volume from the audio equipment furnished within the same vehicle whenever the sound from the voice warning system is produced, the driver can listen to the voice warning information clearly without interference from other audio equipment.

It will be understood by those skilled in the art that the foregoing description is in terms of preferred embodiments of the present invention wherein various changes and modifications may be made without departing from the spirit and the scope of the invention, which is to be defined by the appended claims.

What is claimed is:

1. A voice warning system for an automotive vehicle comprising:
    (a) a plurality of sensors for detecting various abnormal conditions in an automotive vehicle,
    (b) means for outputting voice warning information in response to said sensors when one of said sensors detects an abnormal condition; and
    (c) means for reducing to an audible level lower than an initial audible level an audio signal level sent from other audio equipment provided within the same vehicle so as not to interfere with the voice warning information, said means for reducing the audio signal level being activated by a signal sent from any one of said sensors,
    whereby the driver can hear the voice warning information clearly even when the audio equipment is operating.

2. A voice warning system for an automotive vehicle as set forth in claim 1, wherein said means for reducing the audio signal level comprises:
    (a) a resistor for reducing the audio signal level; and
    (b) a relay which includes:
        (1) a relay coil energized by the signal sent from any one of said sensors;
        (2) a normally-closed first contact for transmitting the audio signal level to the next stage without reduction thereof when said sensors detect no signal;
        (3) a normally-open second contact for transmitting the audio signal level reduced by said resistor which is connected in series with said second contact, said normally-open second contact being closed when said relay coil is energized by the signal sent from any one of said sensors.

3. A voice warning system for an automotive vehicle as set forth in claim 1, which further comprises a mixer for mixing the warning information signal with the audio signal sent from the audio equipment.

4. A voice warning system for an automotive vehicle as set forth in claim 3, which further comprises a speaker used for the audio equipment provided within the same vehicle in order to output the warning information.

5. A voice warning system for an automotive vehicle as set forth in claim 4, which further comprises an audio amplifier used for the audio equipment provided within the same vehicle in order to output the warning information.

* * * * *